United States Patent [19]
Yokoyama et al.

[11] 4,170,032
[45] Oct. 2, 1979

[54] MAGNETIC HEAD AND METHOD FOR PREPARING THE SAME

[75] Inventors: Kazuo Yokoyama; Ryuji Nishiyama, both of Osaka; Taketoshi Yonezawa, Ibaraki, all of Japan

[73] Assignee: Matsushita Electric Industrial Co., Ltd., Osaka, Japan

[21] Appl. No.: 943,397

[22] Filed: Sep. 18, 1978

[30] Foreign Application Priority Data

Sep. 19, 1977 [JP] Japan .................. 52-112815

[51] Int. Cl.² .................. G11B 5/251; G11B 5/42
[52] U.S. Cl. .................. 360/120; 29/603
[58] Field of Search .................. 360/120; 29/603

[56] References Cited
U.S. PATENT DOCUMENTS

| 3,024,318 | 3/1962 | Duinker et al. | 360/120 |
|---|---|---|---|
| 3,458,926 | 8/1969 | Maissel et al. | 360/120 |
| 3,639,701 | 2/1972 | Secrist et al. | 360/120 |
| 3,842,494 | 10/1974 | Chiba et al. | 360/120 |

Primary Examiner—Robert S. Tupper
Attorney, Agent, or Firm—Stevens, Davis, Miller & Mosher

[57] ABSTRACT

A magnetic head having a sputter-deposited glass film of the gap forming area of the magnetic core, said glass film being made of borosilicate glass having the composition consisting of 65-85 mol % of $SiO_2$, 8-30 mol % of $B_2O_3$ and containing 2-15 mol % of alkali metal oxide $Na_2O$ and $K_2O$ and 0.1-5 mol % of $Al_2O_3$, with the molar ratio of boron oxide to alkali metal oxides being defined by the following formula:

$$0.05 < \frac{Na_2O + K_2O}{B_2O_3 + Na_2O + K_2O} < 0.4$$

The magnetic head provides sharpness of the recording leakage flux, thus giving excellent electromagnetic conversion characteristics.

4 Claims, 11 Drawing Figures

CROSS SECTION OF THE OPPOSING FILM

CROSS SECTION OF THE FILM OF FIG.3a

MAGNETIC HEAD AND METHOD FOR PREPARING THE SAME

This invention relates to a magnetic head and a method of producing same, and more particularly it relates to a magnetic head producing method which allows formation of the operative gap with no need of fusing the gap forming members in the magnetic head and hence is capable of producing a magnetic head with high gap length precision, few faults in the gap and excellent electromagnetic conversion characteristics.

Heretofore, in production of the magnetic head, the non-magnetic spacer for the operative gap has been formed from glass material with high hardness and wear resistance for minimizing mechanical gap deformation resulting from sliding contact with the magnetic surface of the recording medium while preventing excessive wear of the operative gap section in comparison with the rate of wear of the magnetic head core. There are known several methods for formation of such glass gap. For instance, a magnetic head core material is first immersed in a mixed solution of finely-crushed glass and then taken out and subjected to centrifugation so that a homogeneous layer of said pulverized glass is deposited on the gap-opposing surfaces of the core members, and then after forming a glass film on said core surfaces by stoving, the two gap opposing faces are butted against each other with said glass film interposed therebetween and fused together by a heat treatment to form a desired operative gap. According to another method, the two gap opposing faces are butted against each other by interposing therebetween a high melting-point spacer with a predetermined gap length while maintaining a space corresponding to the predetermined length between said opposing faces, and then the molten glass material is penetrated into said space.

Recently, radio-frequency sputter deposition method was developed as a novel technique for direct deposition of said glass film. This radio-frequency sputter deposition technique has many advantages over the conventional methods. Firstly, the conventional methods were subject to certain limitations in precision of the glass film thickness because control of the gap length has depended on control of the stoved glass film thickness or adjustment of the gap space retaining spacer, whereas the sputter deposition method allows control of the glass film thickness by the deposition process itself, resuling in far higher precision of the film thickness. According to the sputter deposition method, film thickness precision can be controlled to the tolerance of ±0.02 μm where the glass film thickness is less than 1 μm. Secondarily, according to the conventional methods in which a glass material is fused for forming the gap in the magnetic head, the interface between the magnetic head core member and said gap member is subject to erosion and diffusion, whereas the interface between the sputter-deposited glass and magnetic head core member is minimized in erosion. If a proper measure is taken for preventing deterioration of said interface in a heat treatment after sputter deposition, it is possible to obtain sharpness of the leakage magnetic field at the trailing edge (recording edge) of the operative gap in the magnetic head, and this makes it possible to obtain a magnetic head which is capable of high-output recording and reproduction in recording of high-frequency signals. Also, film surface roughness is significantly improved as compared with the glass film obtained from stoving of pulverized glass, that is, surface roughness of the sputter-deposited glass film is less than about ±0.02 μm, thus assuring good surface smoothness and high adhesion in gap formation.

Thus, the glass formed by sputter deposition has many advantages, but mere substitution of the conventional methods with this sputter deposition technique only for formation of the non-magnetic gap member can not make the most of these advantages for improving the completed magnetic head quality. In the usual process, the gap member is fused for the purpose of bonding it to the magnetic head core member, so that there is inevitably produced a disparity between film thickness and gap length in the completed magnetic head no matter how much is improved the film thickness precision. Also, the correlation-ship between these factors varies depending on the heat treatment conditions (temperature, retention time, core pressing force, etc.) and is subject to wide scatter. Further, the interface with the magnetic head core is apt to undergo erosion and diffusion during fusion of the gap member, and this may make it impossible to make the use of the said second advantage of the spatter film.

The object of this invention is to provide a magnetic head which is free of the said defects inherent to the conventional art and a method of producing such magnetic head according to which bonding of the gap member at the time of formation of the gap member can be accomplished with no need of fusing the gap member so as to allow the best use of the said advantages of the sputter-deposited gap member for the improvement of the completed head quality.

Now the invention is described in detail. The gap glass member which is sputter-deposited in the production of magnetic head according to this invention is borosilicate glass having the composition of 65–85 mol % of $SiO_2$ and 8–30 mol % of $B_2O_3$. It also contains 2–15 mol % of alkali metal oxides $Na_2O$ and $K_2O$ and 0.1–5 mol % of $Al_2O_3$, and the molar ratio of boron oxide to alkali metal oxides is defined by:

$$0.05 < \frac{Na_2O + K_2O}{B_2O_3 + Na_2O + K_2O} < 0.4$$

The gap glass of said composition is deposited on the gap opposing faces of two magnetic core pieces by the radio-frequency sputter deposition technique, and then the gap opposing faces are butted against each other with said glass deposit interposed therebetween and bonded together by heating at a non-fusion temperature which is higher than the transition point but lower than the yielding point of said spatter glass film. Bonding at said non-fusion temprature ranging from transition point to yielding point of said sputter-deposited glass film is a novel art, and its bonding mechanism is now described. The magnetic head using the glass gap member of said composition has the following characteristics.

Because of no fusion of the gap member in the production process, there can be obtained a magnetic head with a gap length substantially equal to the gap film thickness. Therefore, control of gap length can be made by controlling the film thickness, and also extremely high-precision control is possible because film thickness control is made in the sputter deposition process. In trial manufacture of a magnetic head with gap length of 0.25–2 μm according to this invention, it was possible to control the sputter-deposited gap glass film thickness within the range of 0.25–1 μm with tolerance of ±0.02 μm by measuring the film thickness by in-process laser interferometry during spatter deposition. As for the gap length of the completed magnetic head, it was possible to obtain the product at 100% yield with dimensional tolerance of ±0.05 μm.

Further, since no fusion of the gap glass member is necessitated in the production process, the product is free of the gap deficiencies which are usually seen in the fusion-bonded type magnetic heads. The film formed by fusing the sputter-deposited glass film is not always a homogeneous purely vitreous film but tends to include the reaction production with the base (core) member, the reaction product with the organic substances remaining on the base surface and other alient matters such as air bubbles, and various defects originating from such inclusions would be created in the gap of the completed magnetic head. The magnetic head of this invention has in principle no possibility of suffering from such defects since the gap can be formed with no need of fusing the gap member. Further, when the sputter glass composition of this invention is used singly as gap member, the interface between the gap opposing face of each magnetic core and the gap member undergoes no erosion and mutual diffusion during the heat treatment for gap forming because the gap member is not fused, so that it is possible to provide sharpness of the recording leakage flux, thus giving excellent electromagnetic conversion characteristics to the product.

BRIEF DESCRIPTION OF THE DRAWINGS

FIG. 3b is a drawing showing the data of measurement of unevenness along the section X—X in the structure of FIG. 3a.

Figure 1A:
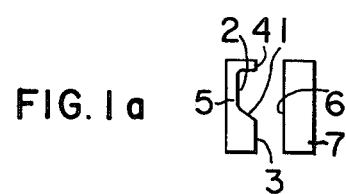
FIGS. 1(a) to (f) are illustrations of the magnetic head production process according to this invention. In the illustrations: 1 . . . apex; 2 . . . recession for winding; 3 . . . front gap opposing face; 4 . . . back gap opposing face; 5 . . . unilateral core; 6 . . . gap opposing face; 7 . . . unilateral core; 8 . . . gap film; 9 . . . bonded glass; 10 . . . cut section; 11 . . . bar; 12 . . . casing; 13 . . . operative gap; 14 . . . recording medium sliding face; 15 . . . winding.
Figure 1B:
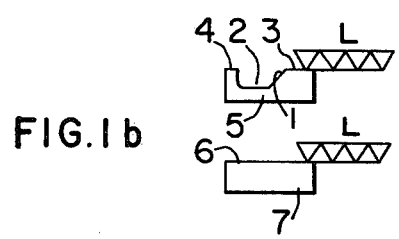
Figure 1C:
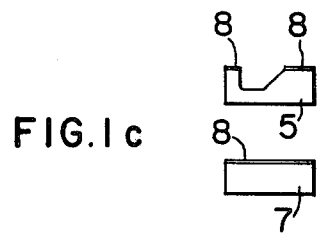
Figure 1D:
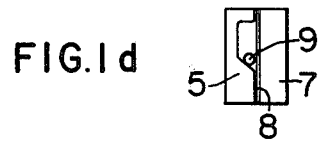

The invention is now described in detail by way of an example thereof.

EXAMPLE

FIGS. 1(a) to (f) illustrate the magnetic head production process according to this invention. A suitable material is cut and machined (a) to prepare a unilateral core piece 5 formed with a recession for winding with an apex 1 and also having a front gap opposing face 3 and back gap opposing face 4 and another unilateral core piece 7 having a gap opposing face 6, then the gap opposing faces 3, 4 and 6 of said core pieces are mirror finished by lapping (b), and then the mirror finished gap opposing faces are further subjected to sputter deposition to form a thin film 8 which is to serve as gap spacer.

The gap spacer film 8 is formed by sputter deposition, and if desired, it may be formed into a multi-layer structure. In case of forming a double-layer structure, a suitable material such as for example $SiO_2$ is deposited as the first layer film which is directly attached to the gap opposing faces of each said core piece, and then a glass film of the above-said composition is formed therebetween as the second layer film.

Then these two unilateral core pieces 5 and 7 are butted against each other with said gap spacer 8 interposed therebetween and bond glass 9 is placed at the apex 1 of the recession 2, followed by a heat treatment to perform gap bonding (d). This gap bonding is practiced by using a special gap forming jig so designed that a back pressure will be exerted to each core piece by a spring means with high heat resistance so as to maintain the proper butted relation of the gap opposing faces during the heat treatment. Upon completion of bonding, the back gap portions of the bonded core pieces are cut out (e) and the cut sections 10 are mirror finished, and then a separately prepared I-shaped bar 11 having a winding coiled thereon is butted and bonded to said sections 10 to thereby form a completed heat tip. The completed magnetic head tip is encapsulated in a suitable casing 12 to constitute a completed magnetic head (f). Thus, the magnetic head tip has an operative gap 13 in its face 14 along which the recording medium passes slidingly, and a winding 15 is disposed in its magnetic path. The core used in this example is an Mn–Zn ferrite core (with 53% by weight of $Fe_2O_3$, 28.0% by weight of MnO and 19.0% by weight of ZnO) produced by hot press.

Figure 2:
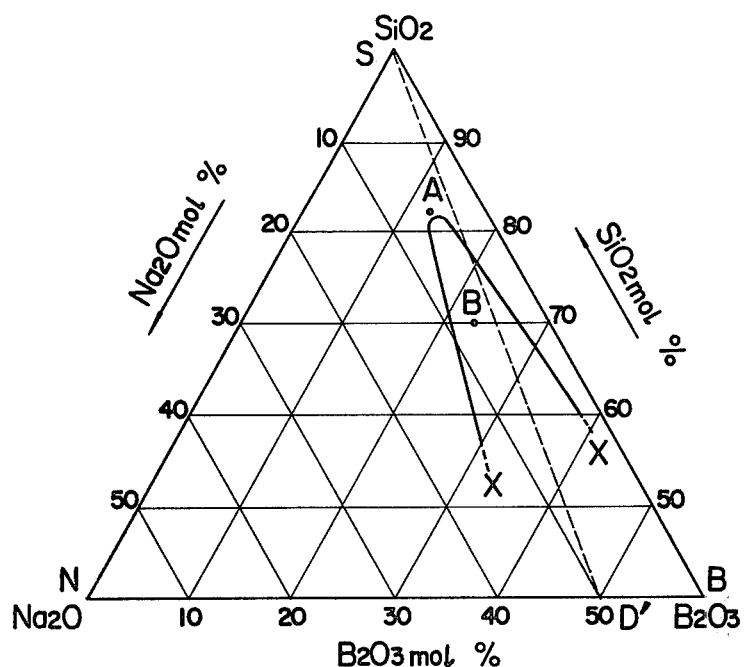
FIG. 2 is a drawing illustrating the composition of alkali borosilicate glass according to this invention.

Used as the gap forming materials in this example were $SiO_2$ as the first layer and a low alkaline borosilicate glass with the composition of 80% $SiO_2$, 13% $B_2O_3$, 4% $Na_2O$ and $K_2O_4$ and 2% $Al_2O_3$ or the composition of 67% $SiO_2$, 22% $B_2O_3$, 6.5% $Na_2O$ and $K_2O$ and 2.0% $Al_2O_3$ as the second layer. The film thickness was 0.02 μm in the first layer and 0.13 μm in the second layer, totalling 0.15 μm (gap length 0.3 μm), or 0.08 μm in the first layer and 0.42 μm in the second layer, totalling 0.5 μm (gap length 1 μm). In the case of low alkaline borosilicate glass, it is known that if no phase separation inhibitor such as $Al_2O_3$ is contained, there occurs a phase separation by a suitable heat treatment when said glass has certain specific compositions. FIG. 2 shows the compositional region where such phase separation takes place in the alkaline borosilicate glass containing $Na_2O$ as alkali metal oxide. It will be noted that phase separation occurs at normal temperature or upon a heat treatment at a temperature ranging from transition point to yielding point when the glass composition is within the region defined by the line X—X in the drawing. The term "phase separation" used herein means a phenomenon that the glass structure is separated into two layers, that is, the layer of high-temperature glass component with high melting point and high $SiO_2$ content and the layer of low-melting-point glass component of soluble borosilicate glass. In ordinary utility glass, a phase separation inhibitor such as $Al_2O_3$ is added in a minor quantity to inhibit such phenomenon. The broken line S-D' in the drawing represents the composition of $Na_2O$—$5B_2O_3$, and according to the theory of glass structure, the region S-D'-B on the low alkaline ($Na_2O$) side of said line is called accumulation region and the high alkaline side is called cut region. In the accumulation region, the decorative oxide $Na_2O$ which got into the parent material having tetrahedral SiO$_4$ and triangular BO$_3$ structures is merely accumulated and the oxygen bridge is not broken, but in the region beyond said limit, the oxygen bridge is cut. Phase separation occurs in the area centering around this boundary. The phase separating glass is typified by low transition point and high yielding point, that is, it has a wide temperature range for the "abnormal expansion region" between transition point and yielding point, so that phase separation may be induced if such glass is maintained under heating in said temperature range for a long time. The spatter deposition film of glass having a composition in said phase separation region and containing a small amount of phase separation inhibitor is bonded in a non-fused condition when heated at a temperature between transition and yielding points. Phase separation of ordinary sense does not occur under this condition, but it is considered that there takes place a phenomenon equivalent to phase separation microscopically and that the low-temperature component has a part in bonding. In fact, the glass with composition of this range is higher in water solubility than glass of other compositions and induces a higher rate of alkali elution, and this is considered conducive to creation of a condition that allows easy migration of alkali metal at the adhesive interface.

There is the general tendency that the coefficient of thermal expansion in the normal temperature range becomes lowest along the said line S–D' when SiO$_2$ is assumed to be constant (the actual measurements are slightly deviated from this tendency), and glass of said range of composition is generally small in coefficient of thermal expansion. This is an important technical advantage in the art of sputter deposition. If the coefficient of thermal expansion is too large, the target may be broken out of commision due to overheat caused as the target is hit by the plus ions. One solution to this problem is utilization of finely-crushed glass as target, but use of such powdery glass in the extremely thin film deposition process is undesirable as scatter of powdery glass results in a reduced yield. The glass with the said range of composition in this invention is sufficiently small to serve as solid glass target.

Said sputter glass film is composed of a SiO$_2$-B$_2$O$_3$-K$_2$O-Na$_2$O-Al$_2$O$_3$ system, and more specifically, the composition comprises 65–85 mol % of SiO$_2$, 8–30 mol % of B$_2$O$_3$, 2–15 mol % of Na$_2$O+K$_2$O and 0.1–5 mol % of Al$_2$O$_3$ and has the following molar ratio definition:

$$0.05 < \frac{Na_2O + K_2O}{B_2O_3 + Na_2O + K_2O} < 0.4$$

Definition of SiO$_2$ loading within the range of 65 to 85 mol % is based on the reason that if SiO$_2$ loading is less than 65 mol %, the resultant glass system becomes lower than 500 in Vickers hardness and hence is unsuited for use as gap glass, while if SiO$_2$ loading is greater than 85 mol %, the melting point of the glass product becomes as high as around 1,000° C., resulting in increased difficulty for fusion. Definition of the alkali metal oxide (Na$_2$O+K$_2$O) loading to 2–15 mol % is due to the fact that greater than 15 mol % loading of these oxides results in higher than $70 \times 10^{-7}$/°C. coefficient of thermal expansion, which is disadvantageous for sputter deposition by use of solid target, while said loading of less than 2 mol % can not produce any significant addition effect of the decorative oxides. Definition of molar ratio of boron oxide (B$_2$O$_3$) to alkali metal oxides (Na$_2$O+K$_2$O) to $$0.05 < \frac{Na_2O + K_2O}{B_2O_3 + Na_2O + K_2O} < 0.4$$

is attributed to the fact that both lower and upper limits of said S–D' line centered by said molar ratio 0.167 comprehend the phase separation area and are within the range where bonding is possible at the temperature range from transition point to yielding point. Addition of Al$_2$O$_3$, in an amount of 0.1 to 5 mol %, is intended to control phase separation. Other numerical definitions are almost automatically determined according to the above-said definitions. 8 to 30 mol % definition for B$_2$O$_3$ loading is for the reason that less than 8 mol % B$_2$O$_3$ loading leads to a too high melting point of the glass product while said loading of higher than 30 mol % results in less than 500 Vickers hardness. The sputter deposition film having the above-defined composition can be obtained by performing sputter deposition with target glass of substantially same composition. In a comparison of the target and film compositions by EPMA (electron probe microanalyzer) and SIMS (secondary ion mass-spectrometer) analyses, almost no variation was seen in the SiO$_2$ and B$_2$O$_3$ components but there were noted a slight decrease of Al$_2$O$_3$ and a decreasing tendency of Na$_2$O and K$_2$O. This suggests use of a target material which contains the alkali metal oxides Na$_2$O and K$_2$O in a slightly greater quantity than above-defined. Slight decrease of Al$_2$O$_3$, or phase separation inhibitor, in the composition indicates a tendency of increase of low temperature adhesion in this invention.

Figure 1E:
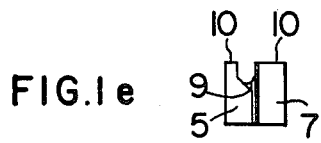
Figure 1F:
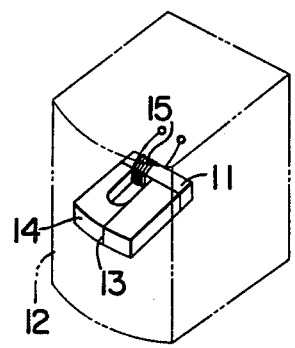
Figure 3B:
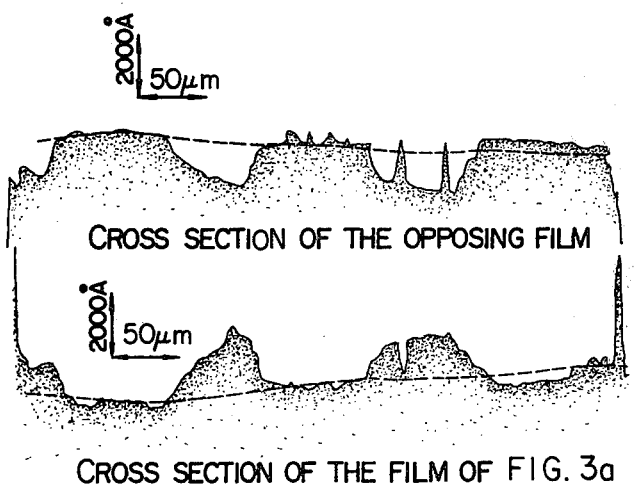
Figure 3A:
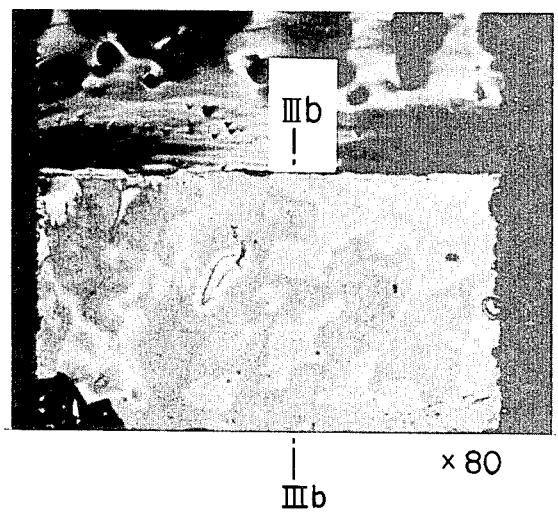
FIG. 3a is a photograph of a forcibly peeled plane in the gap portion of a magnetic head according to this invention.

We will now describe the characteristic features of the gap member having the composition of this invention as determined from the result of an examination of a forcibly peeled section in the gap portion of a magnetic head produced in accordance with the instant example of this invention. The tape sliding face of the completed gapped bar such as shown in FIG. 1(e) was lapped to provide a 0.5 mm gap depth and then 25 pieces of tips with 1 mm core thickness were sliced from the gapped bar with full length of 31 mm. Load was applied to these tips in a manner to cause peeling of the gap and the peeled area was observed. The gap member film was formed by sputter-depositing SiO$_2$ (4000 Å) as first layer and low alkaline borosilicate glass (500 Å) with composition of 67% SiO$_2$, 22% B$_2$O$_3$, 6.5% Na$_2$O+K$_2$O and 2.0% Al$_2$O$_3$ as second layer (total film thickness: 9000 Å), followed by a heat treatment at 700° C. for one hour. 75% of the fractured core tips were broken in the ferrite portion, but the remaining 25% showed peeling in the gap member film portion. An example of such peeled areas is shown in FIG. 3a. It is noted from the film interference color that the sputter deposition film surface remains partly in the peeled area, indicating a distinct difference from ordinary fusion bonding. FIG. 3 shows the results of measurements of unevenness along the section X—X in FIG. 3a and unevenness at the corresponding position of the opposing peeled area by use of a stylus surface measuring instrument. The two patterns of unevenness in FIG. 3b are in an approximately male and female relation, and in view of the fact that the thickness of the first layer is 4,000 Å and that of the second layer is 500 Å, it is noted that peeling in the bonded portion mostly takes place in the first layer. Peeling also occurs partially at the interface of the first and second layers. Thus, one of the salient features of the gap member in the magnetic head of this invention is that because of no fusion of the gap member for bonding, there could take place peeling in the gap member region and an interference color develops at the peeled area. (No peeling occurs if the gap member is bonded fast as said before). As understood from the above results of observation, the gap member for the magnetic head of this invention is bonded in a non-fused state, making it possible to obtain a magnetic head having a gap length just equal to the sputter-deposited film thickness.

Described hereinabove was an example of this invention embodied as a fixed type magnetic head. Shown in the following are the results of an examination on gap length precision in another embodiment of this invention adapted for a helical scanning type rotary magnetic head. In the above-described example, the sputter deposition film is formed on the opposing faces of two unilateral magnetic core pieces, so that bonding is effected in a state where two glass films of the compositions of this invention are butted to each other, but the sputter deposited glass film of the composition of this invention can be similarly bonded when it is subjected to a heat treatment in a state where it is butted against the gap opposing faces of the magnetic head. Therefore, in the below described embodiment, the double-layer film is deposited on the gap opposing faces of only one unilateral magnetic core piece.

Figure 4:
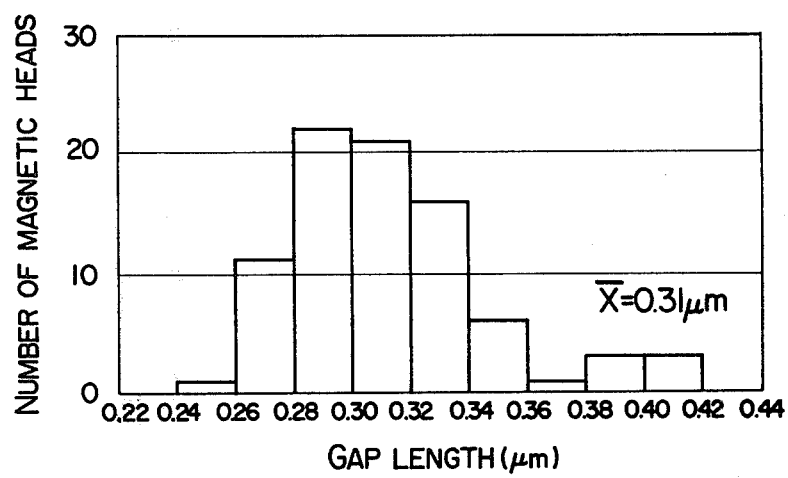
FIGS. 4(a) and (b) are histograms showing the scatter of gap length in the conventional magnetic heads (a) and in the magnetic heads according to this invention (b).
Figure 4:
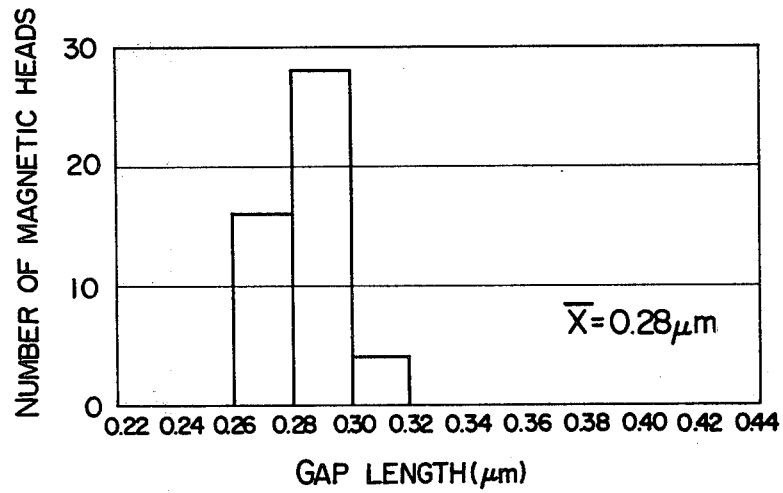

FIG. 4(a) is a histogrammatic representation of the scatter of gap length in the conventional magnetic heads, that is, the magnetic heads of the type in which gap was formed by fusion bonding of gap glass, and FIG. 4(b) is a similar histogrammatic representation for the magnetic heads according to this invention. The magnetic core material used is an Mn-Zn system ferrite (50% by weight of $Fe_2O_3$, 28.0% by weight of MnO and 19.0% by weight of ZnO) produced by hot calcination under pressure. The gap member for the conventional type of magnetic heads was prepared by depositing borosilicate glass with the composition of 69.8% $SiO_2$, 10% $B_2O_3$, 9.9% $Na_2O$ and 4% $K_2O$ and a slightly excess amount of alkali metal on the gap opposing faces of the unilateral magnetic core pieces to the film thickness of 900 Å±100 Å by radio-frequency sputter deposition, and this was followed by a 10-minute heat treatment at 710° C. to form the gap. In the case of this glass, no bonding can be effected at a temperature lower than 700° C., and hence the above-said heat treatment temperature is around the lower limit temperature for bonding. The graph is a histogram of gap length in the produced magnetic heads sampled out from 135 tips in each lot. The average gap length is 0.31 μm. It is considered that the small gap length 0.24 to 0.29 μm in comparison with the film thickness 2,900 Å is due to softening of the film by the heat treatment and the large gap length 0.29 to 0.42 μm in comparison with the film thickness is due to formation of foams in the film by the heat treatment.

In the case of the magnetic heads of this invention, $SiO_2$ was deposited to the thickness of 2,600 Å±50 Å as the first layer and low alkaline borosilicate glass with composition of 67% $SiO_2$, 22% $B_2O_3$ 6.5% $Na_2O$ and 2.0% $Al_2O_3$ to the thickness of 200 Å as the second layer (deposition being made on the unilateral magnetic cores alone), and this was followed by a 1-hour heat treatment at 650° C. which is higher than transition point of the second layer glass but lower than yielding point thereof, thereby to form the gap. The graph shows, by way of a histrogram, the scatter of gap length in the produced magnetic heads sampled out from 269 tips a lot. The average gap length is 0.28 μm. It will be noted that the average value of gap length is in agreement with the film thickness 2,800 Å (sum of first layer thickness and second layer thickness), and the degree of scatter of gap length is far smaller than that in the conventional magnetic heads. It was thus corroborated that the present invention is capable of producing the magnetic heads with uniform gap length which is substantially equal to the film thickness.

Although no particular mentioned was made of adhesive strength of the sputter deposition film in the foregoing description, such adhesive strength varies among glasses having the defined compositions of this invention. In the case of the composition of 80% $SiO_2$, 13% $B_2O_3$, 4% $Na_2O$ and $K_2O$ and 2% $Al_2O_3$ in the above-described embodiment, there occurred peeling from the base when the deposition rate became higher than 1,300 Å/hr (base: Mn-Zn ferrite, base temp.: 150° C., film thickness: 0.5 μm). Although no problem arises with the extremely thin films for narrow gaps, the lower deposition rate than the said level is undesirable in respect of process efficiency in the case of thick films. Generally, glass with high silicic acid, low boric acid and low alkali content has high adhesive strength, but such adhesive strength is greatly affected by the degree of cleaning of the base. That the depositable rate is small means that there is so much scatter in adhesive strength, and this has been a great difficulty in the production process. According to this invention, in order to improve adhesive strength, a material of other composition with higher adhesive strength is first deposited by evaporation on the gap opposing faces of the magnetic core and then glass with the defined composition of this invention is deposited thereon. When $SiO_2$ and a ceramic material (Forstearite, steatite and spinel) were employed as primary deposition layer in the shown embodiment, stabilized sputter deposition can be performed with glass compositions in the defined range of this invention. In a comparative experiment conducted by forming the double-layer film structure from the 0.1 μm thick first layer ($SiO_2$) and 0.4 μm thick second layer and from 0.4 μm first layer ($SiO_2$) and 0.1 μm thick second layer, the expected effect of this invention was provided in both cases, allowing formation of a high-precision defectless gap by low temperature bonding. In the former case, the first layer may be considered as contact material, but in the latter case where the first layer holds the substantial portion of the gap member, the second layer may be regarded as constituting the adhesive layer for low temperature bonding.

In this two-layer structure, since the problem of interface is embraced in the first layer, it is possible to further arrest interface deterioration during the heat treatment by depositing a high-melting-point material for the first layer. It is also possible to perfectly exclude gap faults resulting from the residual impurities at the interface by using high-melting-point glass.

In the above-described embodiment, Mn-Zn ferrite was used as core material, but when the two-layer film structure was formed by using Sendust and Permalloy as core material and depositing $SiO_2$ as first layer, the second layer film could be sputter-deposited with high stability in spite of large difference in thermal expansion coefficient between the magnetic metal core material and gap glass material, and also a high-precision defectless gap could be formed. Use of glass as gapping material in the metallic magnetic head has been generally considered difficult because of the problem resulting from difference in thermal expansion coefficient, but according to this invention, it is possible to obtain an excellent magnetic head by using a magnetic metal material such as Sendust or Permalloy for the magnetic core.

What is claimed is:

1. A magnetic head having a sputter-deposited glass film at the gap forming area of the magnetic core, said glass film being made of borosilicate glass having the composition of 65 to 85 mol % $SiO_2$ and 8 to 30 mol % $B_2O_3$ and containing 2 to 15 mol % of alkali metal oxides $Na_2O$ and $K_2O$ and 0.1 to 5 mol % of $Al_2O_3$, with the molar ratio of boron oxide to alkali metal oxides being defined by:

$$0.05 < \frac{Na_2O + K_2O}{B_2O_3 + Na_2O + K_2O} < 0.4$$

2. A magnetic head of claim 1, wherein a layer with a composition different from that of said sputter-deposited glass film is interposed between said sputter glass film and the gap forming face of said magnetic core.

3. A magnetic head of claim 2, wherein said layer of different composition is a $SiO_2$ layer.

4. A magnetic head of claim 2, wherein said layer of different composition is a ceramic layer.

* * * * *